UNITED STATES PATENT OFFICE.

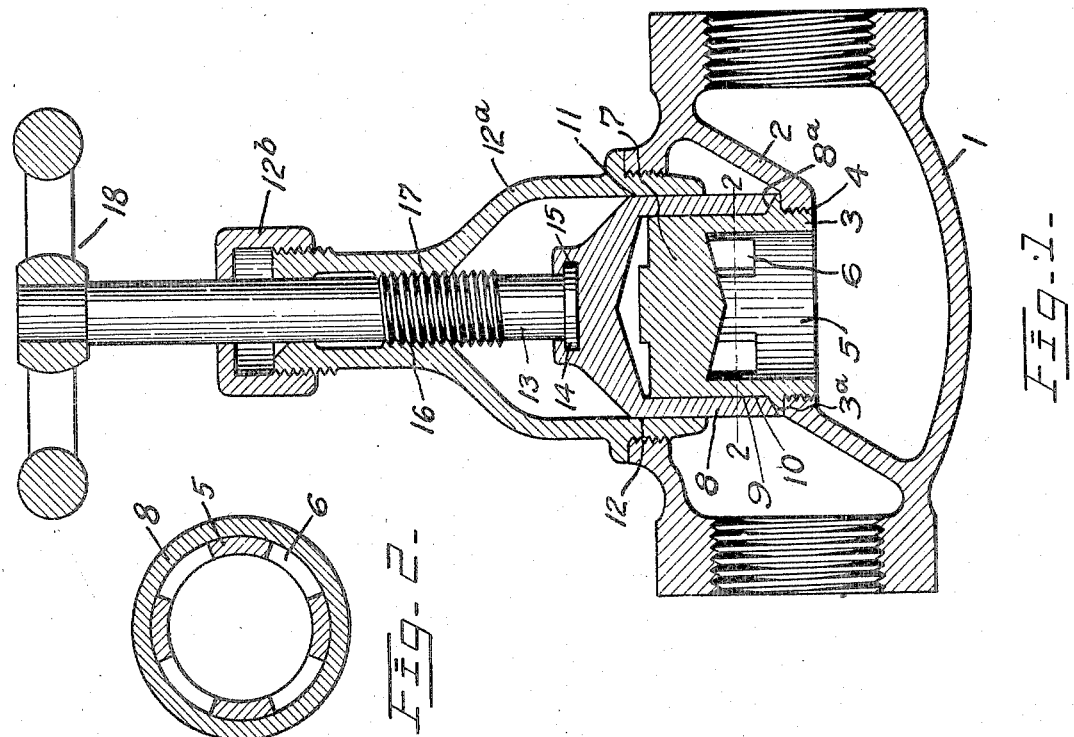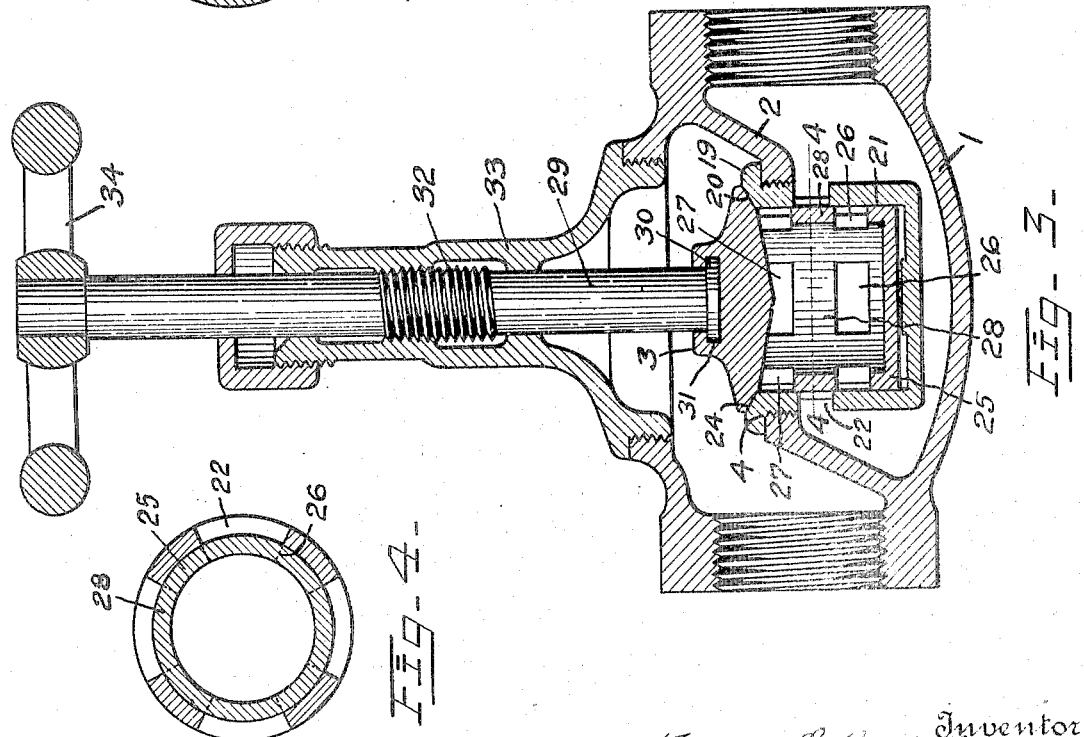

FRANK L. RANDALL AND LOUIS E. SCHMID, OF ERIE, PENNSYLVANIA.

VALVE.

1,307,986.  Specification of Letters Patent.  Patented June 24, 1919.

Application filed January 24, 1918. Serial No. 213,450.

*To all whom it may concern:*

Be it known that we, FRANK L. RANDALL and LOUIS E. SCHMID, citizens of the United States, and residents of Erie, county of Erie, and State of Pennsylvania, have invented new and useful Improvements in Valves, of which the following is a specification.

This invention relates to valves and consists in certain improvements in the construction thereof as will be hereinafter fully described and pointed out in the claims.

The invention is illustrated in the accompanying drawings as follows:—

Figure 1 shows a central vertical section through the valve.

Fig. 2 a section on the line 2—2 in Fig. 1.

Fig. 3 a central vertical section of an alternative construction.

Fig. 4 a section on the line 4—4 in Fig. 3.

1 marks the body of the valve, 2 the diaphragm and 3 a removable valve seat which is screwed into the screw-threaded opening 4 in the diaphragm. The seat has a seating surface 3ª which is at an angle to the axis of the seat. It is also provided with an upwardly extending cylindrical portion 5 through which extend the radial openings 6. The top of the seat is closed by a cap 7 having a conical under surface so as to deflect the liquid flowing through the valve through the openings 6.

The valve head 8 has a cylindrical surface 9 forming a sliding fit with the cylindrical surface 10 on the outside of the cylindrical extension 5. It also has a face 8ª forming a joint with the seating surface 3ª. The valve head is provided with a cylindrical surface 11 on its outer periphery and this forms a closure with the cylindrical surface 12 on the bonnet 12ª. The valve head opens upwardly so that when it is fully open the conical shape of the cap tends to deflect the liquid in a direction which will be little obstructed by the head or the walls of the cylindrical portion.

A stem 13 is provided with a head 14 which is arranged in an undercut socket 15 in the valve head. The stem is provided with the screw thread 16 operating in the screw thread 17 in the bonnet 12ª and the stem is provided with the usual handle 18.

One of the principal objects of the invention is to provide a valve which will close with certainty yet be so nearly balanced as to put but little strain on the operating parts as the threads 16 and 17. This is fully accomplished in this case in that a substantial closure is made by the surfaces 9 and 10 and the face 8ª and the seating surface 3ª simply assure the closure. The surfaces 11 and 12 prevent leakage to the bonnet under ordinary conditions so that little packing on the stem is required. We have shown a gland 12ᵇ of usual construction so as to make the closure more secure.

It will be observed that where the head extends over the seat, the seat extending upwardly toward the bonnet the construction lends itself very readily to the arrangement forming a closure between the valve head and the bonnet.

In the alternative construction a seat 19 is screwed into the screw-threaded opening 4. In this case the seat extends downwardly below the diaphragm and is provided with a seating surface 20 and a cylindrical closure surface 21 on its inner periphery. Radial openings 22 extend through the walls of the extension below the diaphragm. The valve head 23 has a face 24 seating on the surface 20. It also has a cylindrical closure extension 25 with radial openings 26 adapted to be brought into register with the openings 22 and radial openings 27 adapted to be brought above the seating surface 24. It also has a cylindrical closure portion 28 of sufficient width to cover the openings 22 when the valve is in closed position. It will readily be seen that when the valve is opened, the openings 26 may be brought into register with the openings 22 and the openings 27 brought above the closure surface so that there is a passage through the valve. When closed the surfaces of the ring 28 form a complete closure, the seat simply assuring a closure against any leakage.

The stem 29 has a head 30 arranged in a socket 31. It also has the screw threads 32 operating in the bonnet 33 and is provided with the usual handle 34.

What we claim as new is:

1. In a valve, the combination of a body; a diaphragm in the body; a removable seat in the diaphragm having a cylindrical surface with radial openings therethrough and a conically shaped cap for deflecting material to said openings; and a valve head having a closure surface for closing said openings, said head opening upwardly.

2. In a valve, the combination of a body; a diaphragm in the body; a removable seat member in the diaphragm having a cylindrical surface with radial openings therethrough; a valve head member having a closure surface for closing said openings, said head member opening upwardly; and a conically shaped cap carried by one of said members for deflecting material in a radial direction toward the discharge formed by said radial openings in the valve seat.

In testimony whereof we have hereunto set our hands.

FRANK L. RANDALL.
LOUIS E. SCHMID.